(12) United States Patent
Yu et al.

(10) Patent No.: US 12,308,649 B2
(45) Date of Patent: May 20, 2025

(54) CONTROL OF VEHICLE AND HOME ENERGY STORAGE SYSTEMS

(71) Applicant: FORD GLOBAL TECHNOLOGIES, LLC, Dearborn, MI (US)

(72) Inventors: Lan Yu, Canton, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 47 days.

(21) Appl. No.: 17/989,827

(22) Filed: Nov. 18, 2022

(65) Prior Publication Data
US 2024/0170967 A1    May 23, 2024

(51) Int. Cl.
| | |
|---|---|
| H02J 3/14 | (2006.01) |
| B60L 53/62 | (2019.01) |
| B60L 55/00 | (2019.01) |
| G06Q 30/0201 | (2023.01) |
| G06Q 50/06 | (2012.01) |
| H02J 3/32 | (2006.01) |

(52) U.S. Cl.
CPC ............ *H02J 3/32* (2013.01); *B60L 53/62* (2019.02); *B60L 55/00* (2019.02); *G06Q 30/0206* (2013.01); *G06Q 50/06* (2013.01); *H02J 3/144* (2020.01)

(58) Field of Classification Search
CPC ..... H02J 3/32; H02J 3/144; H02J 3/14; B60L 53/62; B60L 55/00; G06Q 30/0206; G06Q 50/06
USPC ...................................................... 307/9.1
See application file for complete search history.

(56) References Cited

U.S. PATENT DOCUMENTS

| | | | |
|---|---|---|---|
| 8,718,850 B2 | 5/2014 | Bozchalui et al. | |
| 9,843,189 B2 | 12/2017 | Kamalasadan et al. | |
| 10,338,622 B2 | 7/2019 | Nakasone | |
| 2013/0024035 A1* | 1/2013 | Ito .......................... | B60L 53/51 700/291 |
| 2016/0006246 A1 | 1/2016 | Yano et al. | |
| 2018/0022228 A1 | 1/2018 | Mazaira et al. | |
| 2018/0037121 A1* | 2/2018 | Narla ....................... | H02J 3/38 |
| 2020/0161859 A1* | 5/2020 | Bell ......................... | H02J 3/14 |
| 2023/0038882 A1 | 2/2023 | Zhao et al. | |

FOREIGN PATENT DOCUMENTS

KR    102118355 B1    6/2020

OTHER PUBLICATIONS

Office Action of U.S. Appl. No. 17/989,842 mailed Feb. 15, 2024, 10 pages.

* cited by examiner

*Primary Examiner* — Elim Ortiz
*Assistant Examiner* — Xuan Ly
(74) *Attorney, Agent, or Firm* — David B. Kelley; Brooks Kushman P.C.

(57) ABSTRACT

A method includes responsive to indication that a predicted electricity price will exceed a predefined threshold during a timeframe, charging one or more power storage devices to a target amount, that is based on a predicted power demand of the building during the timeframe, before the timeframe begins, and discharging the one or more power storage devices to supply power to the building during the timeframe.

13 Claims, 7 Drawing Sheets

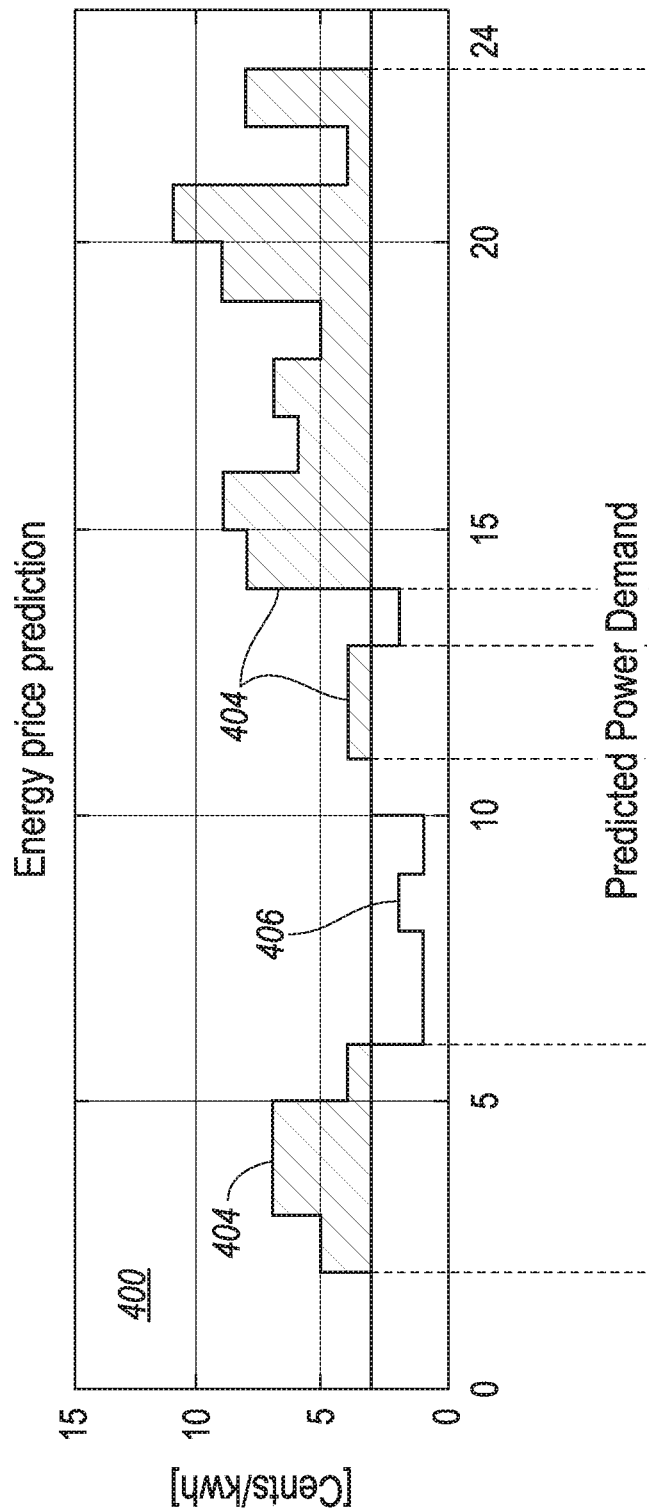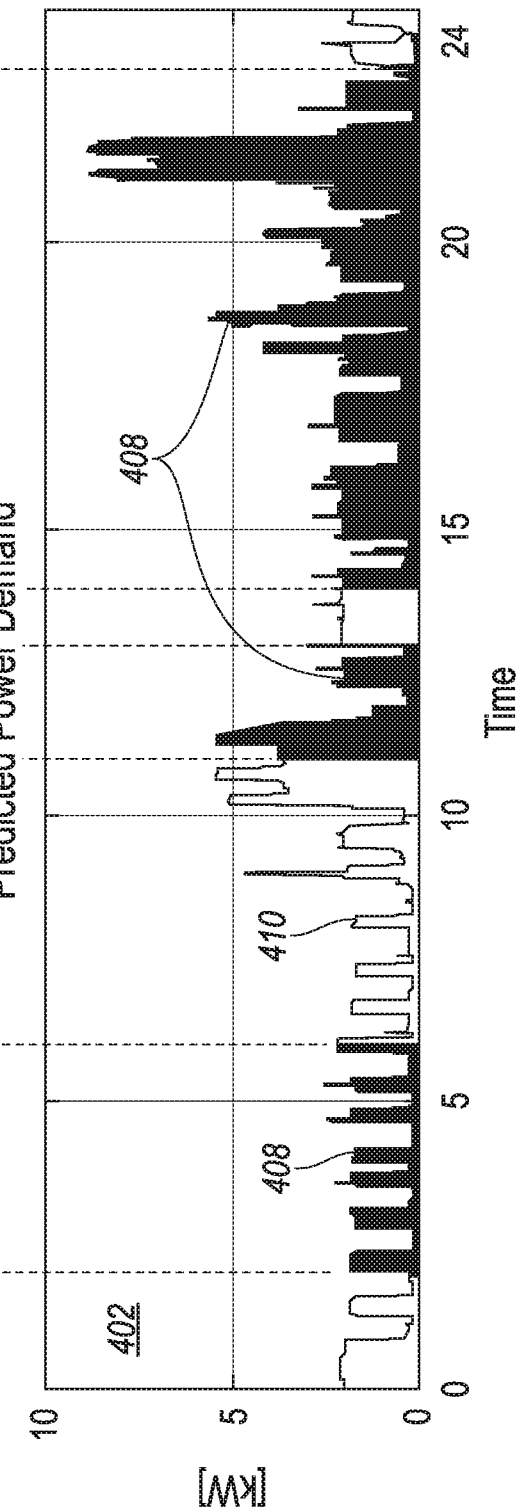

500

US 12,308,649 B2

CONTROL OF VEHICLE AND HOME ENERGY STORAGE SYSTEMS

TECHNICAL FIELD

The present disclosure relates to systems for coordinating electric energy storage between various entities.

BACKGROUND

Utility companies may offer variable electricity rates based on real time pricing. A home energy ecosystem (HEE) may include energy storage devices such as home energy storage (HES), an electric vehicle battery or the like to store electricity. The stored electricity may be used to power various devices such as appliances, AC systems and other devices. Operations of the HEE may be controlled via a home energy management system (HEMS).

SUMMARY

A power system for a building includes one or more controllers that, responsive to indication that a predicted electricity price will exceed a predefined threshold during a timeframe, charge one or more power storage devices to a target amount, that is based on a predicted power demand of the building during the timeframe, before the timeframe begins, and discharge the one or more power storage devices to supply power to the building during the timeframe.

A method includes, responsive to indication that a predicted electricity price will exceed a predefined threshold during a timeframe, charging one or more power storage devices to a target amount, that is based on a predicted power demand of the building during the timeframe, before the timeframe begins, and discharging the one or more power storage devices to supply power to the building during the timeframe.

A server, in communication with a building having a power storage device, includes one or more controllers that, responsive to indication that a predicted electricity price will exceed a predefined threshold during a plurality of timeframes, command the power storage device to charge to a first energy level before the timeframe begins, and to discharge the power storage device to supply power to the building during the timeframes, wherein the first energy level is sufficient to satisfy a first power demand of the building during a first of the timeframes.

BRIEF DESCRIPTION OF THE DRAWINGS

FIGS. 4A and 4B are data diagrams of the predicted power price and the predicted power demand of one embodiment of the present disclosure.

DETAILED DESCRIPTION

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
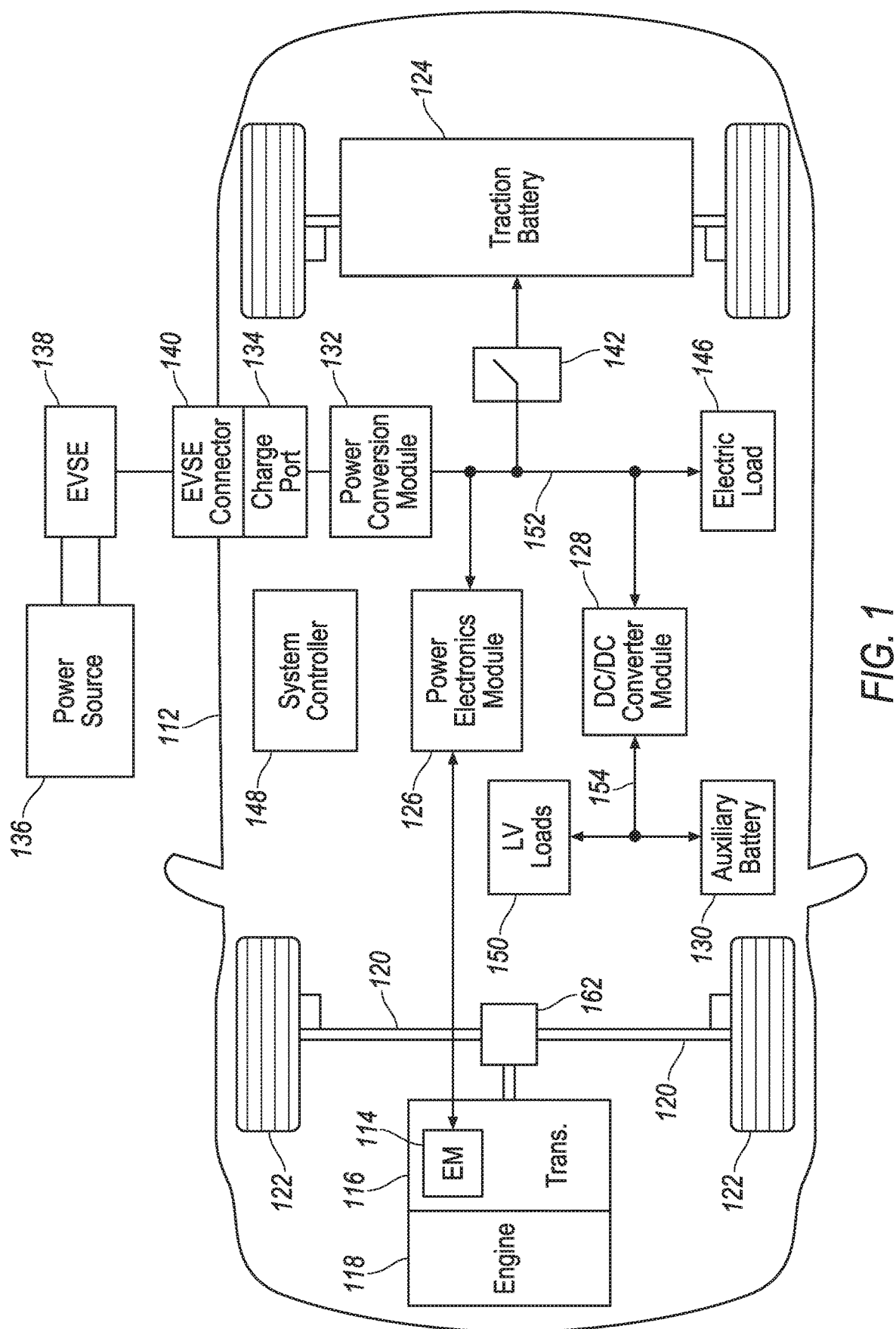
FIG. 1 is a diagram of an electrified vehicle illustrating drivetrain and energy storage components including an electric machine.

FIG. 1 depicts an electrified vehicle 112 that may be referred to as a plug-in hybrid-electric vehicle (PHEV). A plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and braking capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a Battery Electric Vehicle (BEV). In a BEV configuration, the engine 118 may not be present.

A traction battery or battery pack 124 stores energy that can be used by the electric machines 114. The vehicle battery pack 124 may provide a high voltage direct current (DC) output. The traction battery 124 may be electrically coupled to one or more power electronics modules 126 (such as a traction inverter). One or more contactors 142 may isolate the traction battery 124 from other components when opened and connect the traction battery 124 to other components when closed. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

The vehicle 112 may include a variable-voltage converter (VVC) (not shown) electrically coupled between the traction battery 124 and the power electronics module 126. The VVC may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a DC/DC converter module 128 that converts the high voltage DC output of the traction battery 124 to a low voltage DC supply that is compatible with low-voltage vehicle loads. An output of the DC/DC converter module 128 may be electrically coupled to an auxiliary battery 130 (e.g., 12V battery) for charging the auxiliary battery 130. The low-voltage systems may be electrically coupled to the auxiliary battery 130. One or more electrical loads 146 may be coupled to the high-voltage bus/rail. The electrical loads 146 may have an associated controller that operates and controls the electrical loads 146 when appropriate. Examples of electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling. Additionally, the vehicle 112 may be configured to provide electric power from the traction battery 124 to off-board power storage and/or a power grid (not shown) via the EVSE 138 and EVSE connection 140 under the control of controllers such as the power conversion module 132 or one or more remote controllers such as a cloud server (not shown). Alternatively, the power transfer from the traction battery 124 to the off-board load (e.g. the HES) may be performed without utilizing the power conversion module 132 since both the traction battery 124 and the HES are DC power. Transferring from the traction battery 124 to the power grid may require utilizing the power conversion module 132 as the power grid may be on AC power only. The traction battery 124 may be directly connected to the charge port to transfer and/or receive DC power. For instance, the EVSE 138 may be integrated or associated with a home having a HES as power backup. The vehicle 112 may be operated as a portable power storage to transfer power from and to the HES coordinated by a HEMS (to be described in detail below).

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by the Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 148 may be present to coordinate the operation of the various components.

Figure 2:
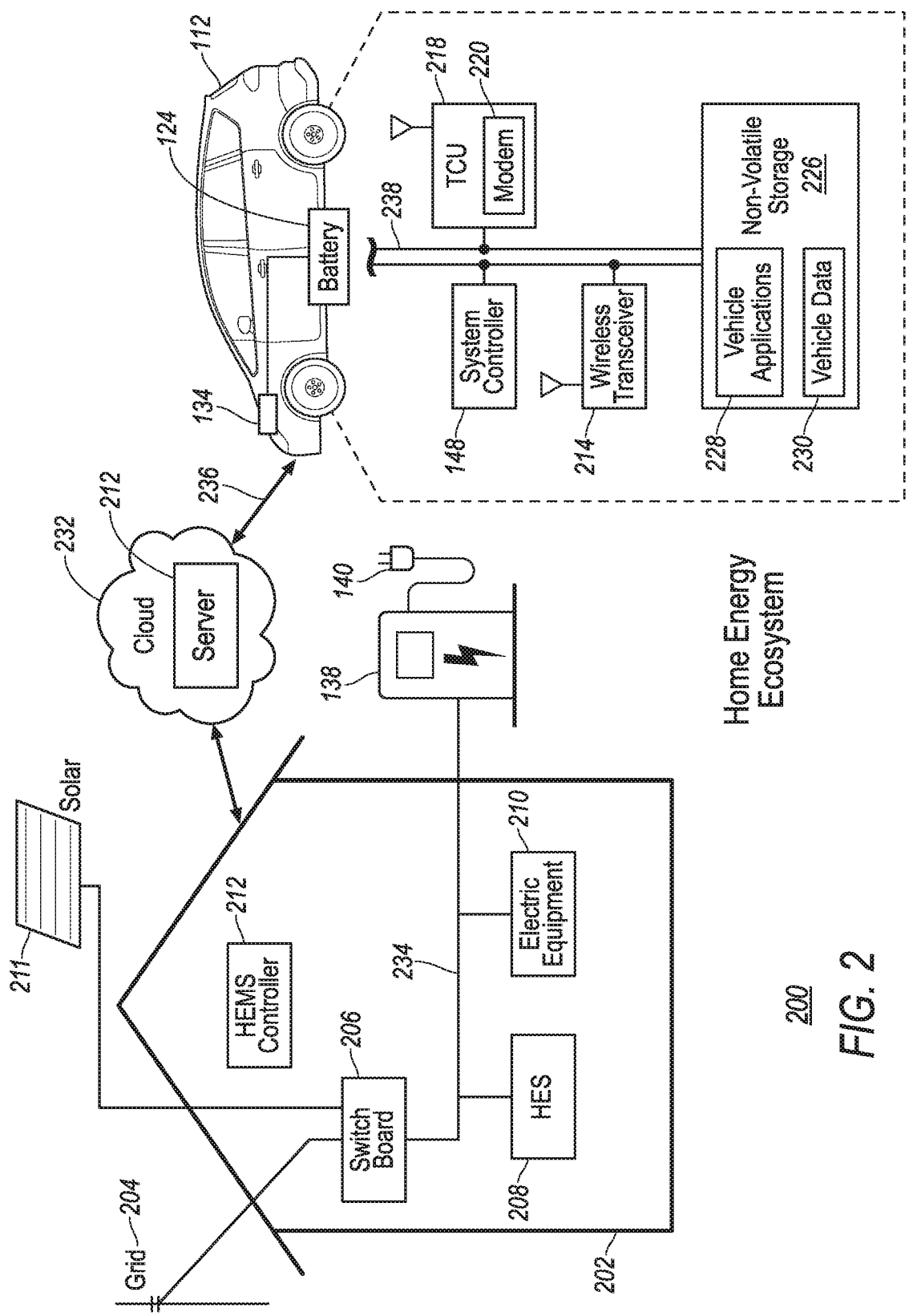
FIG. 2 is a diagram of a HEMS associated with an electric vehicle.

FIG. 2 depicts a diagram of a home energy management system associated with an electric vehicle. A home energy ecosystem (HEE) 200 in the present example may be implemented for a house/building 202. The house 202 may access electric power from a power grid 204 via a switch board 206 configured to provide various components of the HEE 200 with electric power via an internal powerline 234. For instance, the HEE 200 may include one or more electric equipment 210 (e.g. appliance) configured to consume electricity and provide various features to the household. The HEE 200 may further include a HES 208 configured to store electric energy. The HES 208 may be implemented in various forms. As an example, the HES 208 may include a rechargeable battery (e.g. lithium-ion battery) to store electric energy received from the grid 204 (or other sources) and to provide the electric energy to the internal powerline 234 whenever needed. Since the electric energy may be stored as DC power in the HES 208, one or more DC/AC inverters may be provided with the HES 208 for power transitions. The house 202 may be further connected to a solar panel 211 via the switch board 206. The solar panel 211 may be configured to generate and supply electric power to the HES 208 via the internal power line 234. The solar panel 211 may generate a DC electric power having a voltage that is the same or different from the voltage of the HES 208. In one example, the solar panel 211 may be configured to charge the HES 208 via one or more DC/DC converters. Alternatively, one or more DC/AC inverters may be provided with the solar panel 211 and/or the switch board for power transitions. It is noted that although the solar panel 211 is provided to the house 202 for electric power generating in the present embodiment, the present disclosure is not limited thereto. In other words, the house 202 may be provided with other means of power generating capabilities such as a wind turbine or the like.

With continuing reference to FIG. 1, the internal powerline 234 may be further connected to an EVSE 138 configured to transfer electric energy with an electric vehicle 112. The EVSE 138 may be installed within or near the house 202 (e.g. in a garage) and adapted to a home electric energy configuration having a predefined voltage and maximum current supported by the switch board 206. As discussed with reference to FIG. 1, the EVSE 138 may be configured to connect to the vehicle 112 via the charge port 134 to charge the traction battery 124. Additionally, the EVSE 138 may be further configured to draw electric power from the traction battery 124 of the vehicle 112 to supply power to the HEE 200 or the grid 204. For instance, the EVSE 138 may be configured to draw electric power from the vehicle 112 and the HES 208 to power the components of the house 202 during peak hours when the electricity price is high to avoid paying a premium to the utility company.

The power management of the HEE 200 may be controlled and coordinated by a HEMS controller 212 associated with the house 202. The HEMS controller 212 may be implemented in various manners. For instance, the HEMS controller 212 may be a dedicated controller located within the house 202 and connected to components of the home energy ecosystem or smart home devices HEE 200 via wired or wireless connections (not shown). Alternatively, the HEMS controller 212 may be remotely implemented via a cloud server 213 through the Internet and configured to remotely monitor and control the operations of components of the HEE 200. In any or all of the above implementation examples, the HEMS controller 212 may be provided with software to monitor and control the operations of the various components of the home energy ecosystem HEE 200. The HEMS controller 212 may be further provided with an interface associated with input and output devices to interact with a user of the HEE 200. The HEMS 212 may be further connected to a cloud 232 via a public or private network to communicate with other entities such as the utility company to facilitate the planning and controlling of the HEE 200. For instance, the HEMS 212 may be configured to operate the charging and discharging of the HES 208 and battery 124 of the vehicle 112 based on the current and/or predicted electricity price received from an entity (e.g. utility company) via the cloud 232. In one example, the HEMS controller 212 may be implemented via the cloud server 232 through software without dedicated hardware structure for the house 202. It is noted that the term cloud 232 recited in the present disclosure is used as a general term and may include any computing network involving carriers, router, computers, controllers, circuitries, servers or the like configured to store data and perform data processing functions and facilitate communication between various entities.

With continuing reference to FIG. 1, the vehicle 112 may further include various components to facilitate the power transaction between the battery 124, the EVSE 138 and the grid 204. The vehicle 112 may include a system controller 148 configured to perform instructions, commands and other routines in support of the processes described herein. For instance, the system controller 148 may include one or more processors and be configured to execute instructions of vehicle application 228 to provide features such as wireless communication and power management. Such instructions and other data may be maintained in a non-volatile manner using a variety of computer-readable storage medium 226 as a part of vehicle applications 228 and vehicle data 230. The computer-readable medium 226 (also referred to as a processor-readable medium or storage) may include any non-transitory medium (e.g. tangible medium) that participates in providing instructions or other data that may be used by the system controller 148. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and structured query language (SQL).

The vehicle 112 may be further configured to wirelessly communicate with a variety of digital entities via a wireless transceiver 214. For instance, the vehicle 112 may be configured to communicate with the HEMS controller 212 (local or remote) via the wireless transceiver 214 to perform various operations. Additionally or alternatively, the communication between the vehicle 112 and the HEMS controller may be enabled by the EVSE connector 140 coupled with the charge port 134 configured to support digital communication protocols. The wireless transceiver 214 may be configured to support a variety of wireless communication protocols enabled by wireless controllers (not shown) in communication with the wireless transceiver 214. As a few non-limiting examples, the wireless controllers may include a Wi-Fi controller, a Bluetooth controller, a radio-frequency identification (RFID) controller, a near-field communication (NFC) controller, and other devices such as a Zigbee transceiver, an IrDA transceiver, an ultra-wide band (UWB) transceiver, or the like.

The vehicle 112 may be further provided with a telematics control unit (TCU) 218 configured to control telecommunication between the vehicle 112 and the cloud 232 through a wireless connection 236 using a modem 220. The wireless connection 236 may be in the form of various communication networks (e.g. cellular network). Through the wireless connection 236, the vehicle 112 may access one or more servers 213 of the cloud 232 to access various content for various purposes. The various components of the vehicle 112 introduced above may be connected to each other via in-vehicle network 238. The in-vehicle network 238 may include, but is not limited to, one or more of a controller area network (CAN), an Ethernet network, and a media-oriented system transport (MOST), as some examples.

Figure 3:
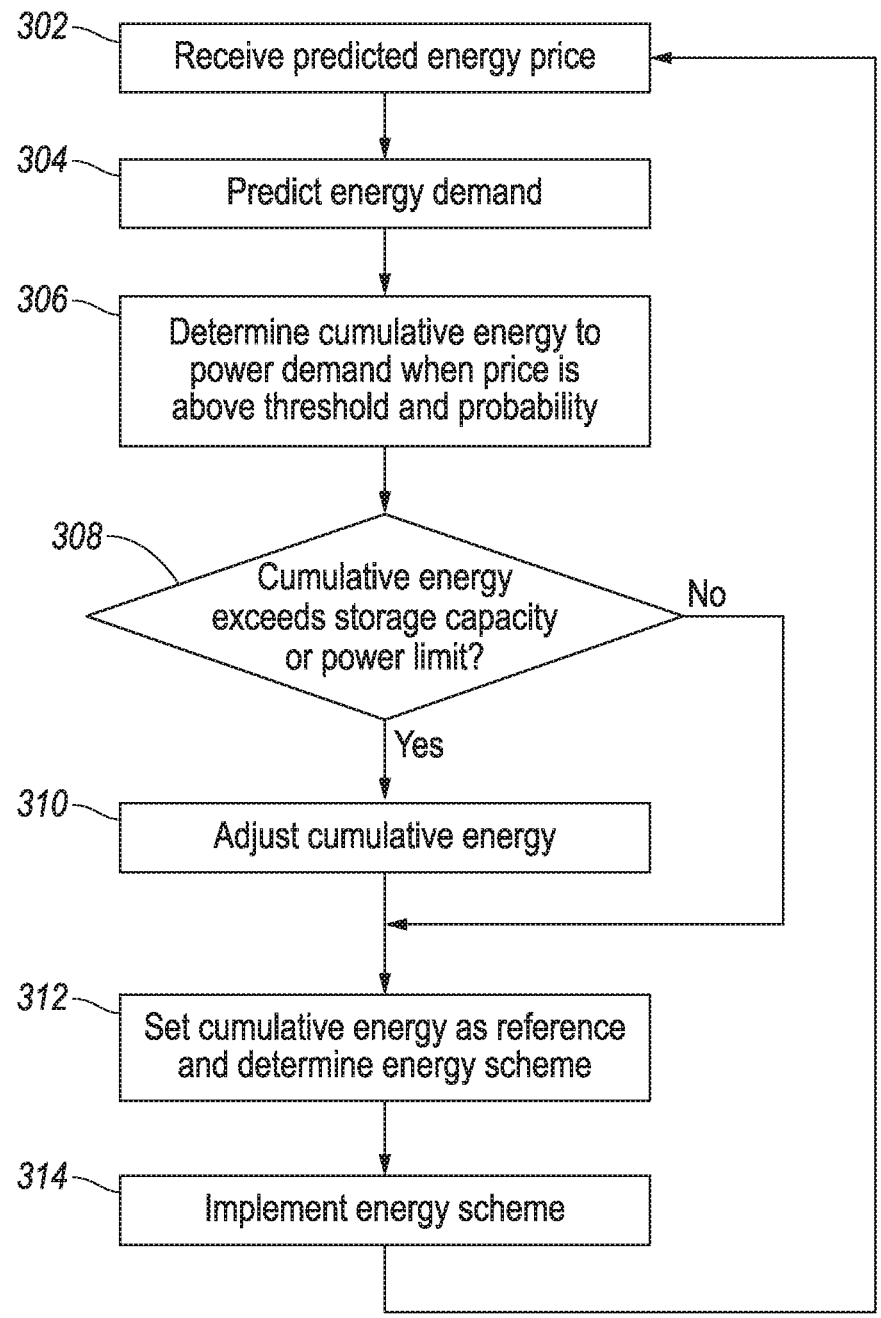
FIG. 3 is flow diagram of a process for operating the HEE based on energy price.

The HEMS controller 212 may be configured to control and coordinate the energy distribution of the house 202 based on various factors. For instance, the HEMS controller 212 may be configured to store a cumulative energy by charging the HES 208 and/or the vehicle battery 124 when the electricity price is low to accommodate a future demand when the electricity price is high such that utility bills of the household may be reduced. Referring to FIG. 3, an example flow diagram of a process 300 for operating the HEE based on energy price is illustrated. With continuing reference to FIGS. 1-2, the process 300 may be individually or collectively implemented via the local HEMS controller 212, the remote server 213, and/or the system controller 124 of the vehicle 112. For simplicity, the following description will be made with reference to the local HEMS controller 212. At operation 302 the HEMS controller 212 receives a predicted future energy price for a predefined period of time from the cloud 232. In the present example, the energy price may include the electricity price although the present disclosure is not limited thereto. Other types of energy may be applied to the present disclosure under essentially the same concept. For instance, the energy price may include a hydrogen price, natural gas price in additional to or in lieu of the electricity price. The predicted price may cover a predefined period of time in the future. For instance, the predicted energy may cover the next 24 hour time period based on historical data and anticipated power demand. In a dynamic energy market environment, energy providers may be allowed to adjust the energy price dynamically every preset time interval (e.g. one minute, ten minutes, one hour or the like). The predicted energy price may include a plurality of single price values corresponding to a future timeframe. Alternatively, the predicted energy price may include a plurality of price ranges defined by an upper bound and a lower bound corresponding to a future timeframe. Additionally or alternatively, instead of receiving the energy price from the cloud 232, the HEMS controller 212 may be configured to determine the predicted energy price based on past price data as well as other factors.

At operation 304, the HEMS controller 212 predicts an energy demand of the HEE in the future time period corresponding to the predicted energy price as received. The HEMS controller 212 may predict the energy demand using various factors. As a few non-limiting examples, the HEMS controller 212 may predict the energy demand based on the state of charge of the vehicle battery 124 and a planned trip of the vehicle 112 to determine an amount of charge for charging the vehicle 112 and time when the charging needs to complete. The HEMS controller 212 may further predict the energy demand based on historical data indicative of the past energy consumption throughout a period of time (e.g. a day). At operation 306, the HEMS controller 212 determines a cumulative energy amount sufficient to satisfy the power demand during the future timeframe when the predicted energy price is above a threshold, and a probability that the cumulative energy corresponding to each time period will be needed. In general, the HEE 200 is preferably configured to accumulate the energy when the energy price is below the threshold and use the accumulated energy when the price is above the threshold. In an example, the current energy price may be used as the threshold. Details of operation 306 will be discussed below.

With the cumulative energy determined, at operation 308, the HEMS controller 212 verifies if the cumulative energy exceeds the storage capacity and power limit of the HEE during the predicted period of time. The HES 208 and the vehicle battery 124 are associated with limited electric energy storage capacity, and the vehicle 112 may be unplugged and unavailable for storing the cumulative power during the predicted time period. In addition, even if the total energy storage amount is sufficient to store the cumulative power, charging and discharging power limits of the HES 208 and the vehicle battery 124 may prohibit the HEE 200 from totally relying on the cumulative power without drawing any power from the grid 204. If either of the storage capacity or power limit is exceeded, the process proceeds from operation 308 to operation 310 and the HEMS controller 212 adjusts the cumulative energy amount using the capacity and/or power limit. Otherwise, if the storage capacity and power limit are not exceeded, the process proceeds to operation 312 and the HEMS controller 212 sets the cumulative energy amount as a reference and determines the energy scheme using the cumulative energy amount. The energy scheme may include the total amount of cumulative energy and operations to charge and discharge the energy storage devices such as the HES 208 and the vehicle battery 124. At operation 314, the HEMS controller 212 implements the energy scheme by performing charging and discharging at the corresponding time.

The operation of process 300 may be applied to various situations. Referring to FIGS. 4A and 4B, data diagrams of one example of the present disclosure are illustrated. More specifically, FIG. 4A illustrates a data graph of the predicted energy 400 and FIG. 4B illustrates a data graph of the predicted power demand 402. As discussed above with reference to FIG. 3, the HEMS controller 212 may receive the predicted energy price 400 and obtain a predicted power demand 402 for the future predetermined period of time (24 hours in the present example). Although the predicted energy price 400 is illustrated as a single value at each timing point in a line graph in FIG. 4A, the present disclosure is not limited thereto. In an alternative example, the predicted energy price 400 may be received or determined in the form of a price range having an upper bound and a lower bound at each timing point. Since the prediction includes a range of potential prices, multiple prediction curves may be possible. For simplicity, FIG. 4A illustrates only one of the possible energy price prediction curves 400. The predicted energy price 400 may be divided into two sections. One or more shaded sections 404 may correspond to timeframes when the predicted energy price exceeding a threshold, whereas one or more unshaded sections 406 may correspond to timeframes when the predicted energy price is below the threshold. There are many ways to determine the threshold. As a few non-limiting examples, the threshold may be the current energy price value when the prediction starts (i.e. time "0"). Alternatively, the threshold may be a customized threshold manually or automatically set depending on the predicted power demand 402 of the HEE 200. For instance, responsive to a higher predicted power demand, the threshold may decrease such that more timeframes will be included in the shaded sections 404. Alternatively, multiple thresholds corresponding to different times may be used. For instance, a first threshold may be used for off-peak hours and a second threshold may be used for peak hours. In the present example illustrated in FIG. 4A, the current energy price may be selected as the threshold. The general idea is to operate the HEE 200 to store/charge the HES 208 and vehicle battery 124 during the timeframe corresponding to the unshaded sections 406 when the energy price 400 is lower, and use/discharge the HES 208 and vehicle battery 124 during the timeframe corresponding to the shaded section 404 when the energy price is higher. In the present example, the cumulative energy is calculated for the entire period of time of the energy price prediction (the next 24 hours).

Figure 5:
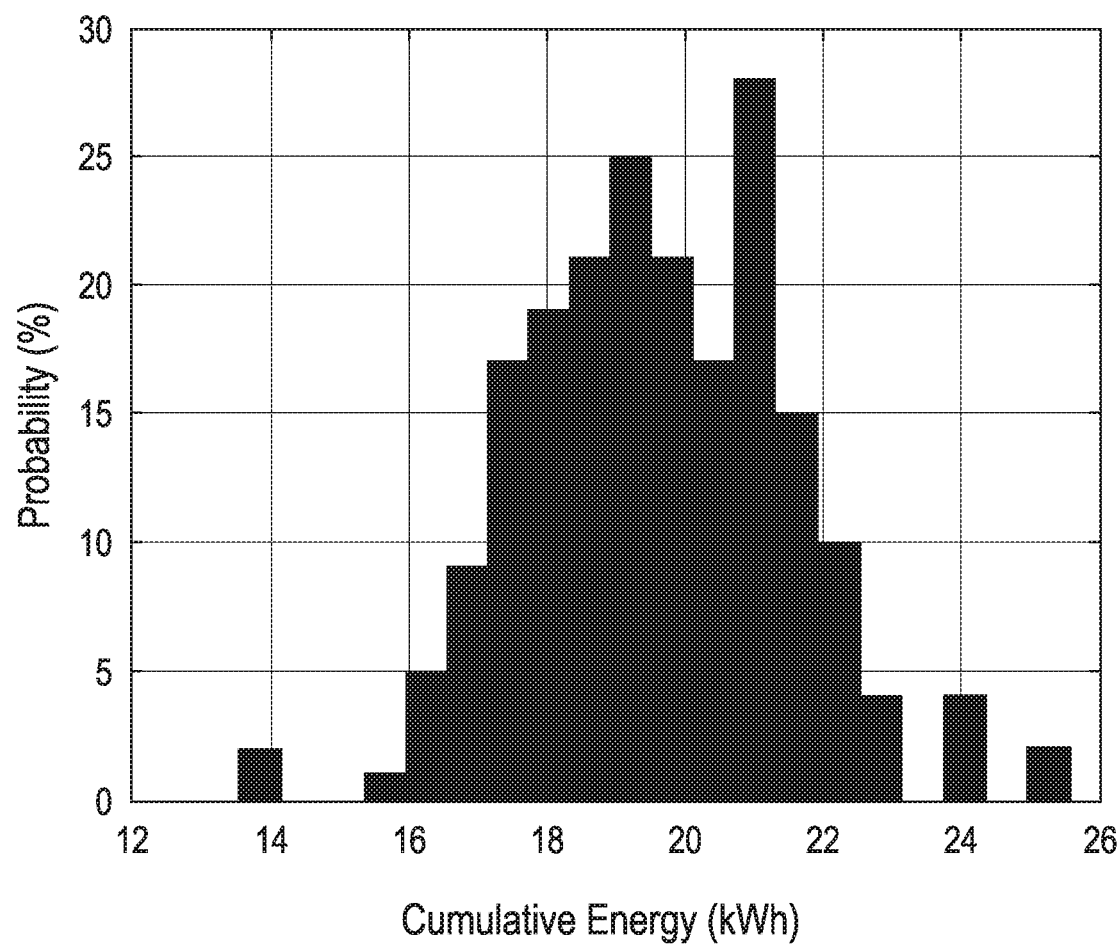
FIG. 5 is a histogram of a cumulated energy distribution of one embodiment of the present disclosure.

Referring to FIG. 4B, the predicted power demand 402 corresponding to the entire future predefined period of time for the energy price prediction is illustrated. Similarly, the predicted power demand 402 may be divided into two sections including one or more shaded sections 408 corresponding to timeframes when the predicted energy price exceeds the threshold and one or more unshaded sections 410 corresponding to timeframes when the predicted energy price is below the threshold for the entire future predefined period of time. The total amount of predicted power demand during the shaded sections timeframe 408 may define the cumulative amount of energy. As discussed above, since multiple energy price prediction curves are possible, each of the possible price prediction curves may result in different shade patterns and thus a different cumulative energy amount. With reference to FIG. 5, an example histogram of a cumulated energy distribution 500 resulting from those potential price prediction curves is illustrated. The cumulated energy distribution histogram 500 has a horizontal axis indicating the cumulative energy in units of KWh and a vertical axis indicating the probability in percentage. The probability of each respective cumulative energy amount may be calculated using various methods. For instance, the probability may be calculated using the Monte Carlo simulation (example illustrated in FIG. 5). Alternatively, the probability of the cumulative energy may be calculated analytically using the following equation:

$$P\{E\} = P\{(\overline{\gamma}[k+i] \geq \gamma[k]) \cup (\overline{\gamma}[k+j] < \gamma[k])\} \quad (1)$$

$$= \prod_i P\{\overline{\gamma}[k+i] \geq \gamma[k]\} \prod_j P\{\overline{\gamma}[k+j] < \gamma[k]\}$$

$$= \prod_i \int_{\gamma[k]}^{\infty} pdf_{k+i}(x)dx \prod_j \int_{-\infty}^{\gamma[k]} pdf_{k+i}(x)dx$$

wherein γ[k] represents the current electricity price, $\overline{\gamma}$[k+j] represents the predicted electricity price in the upcoming $j^{th}$ period, $pdf_{k+1}(x)$ represents the price distribution of $\overline{\gamma}$[k+j] for period j. The cumulative energy E is calculated as:

$$E = \Sigma_i \int_{t[k+i]}^{t[k+i+1]} \text{load}(t)dt \quad (2)$$

where load(t) represents the predicted load energy at time t, t[k] represents the current time interval, and i represents the $i^{th}$ future time interval when the predicted energy price is higher than the current price. The cumulative energy will cover the future energy consumption at those time intervals in order to save electricity.

Figure 6A:
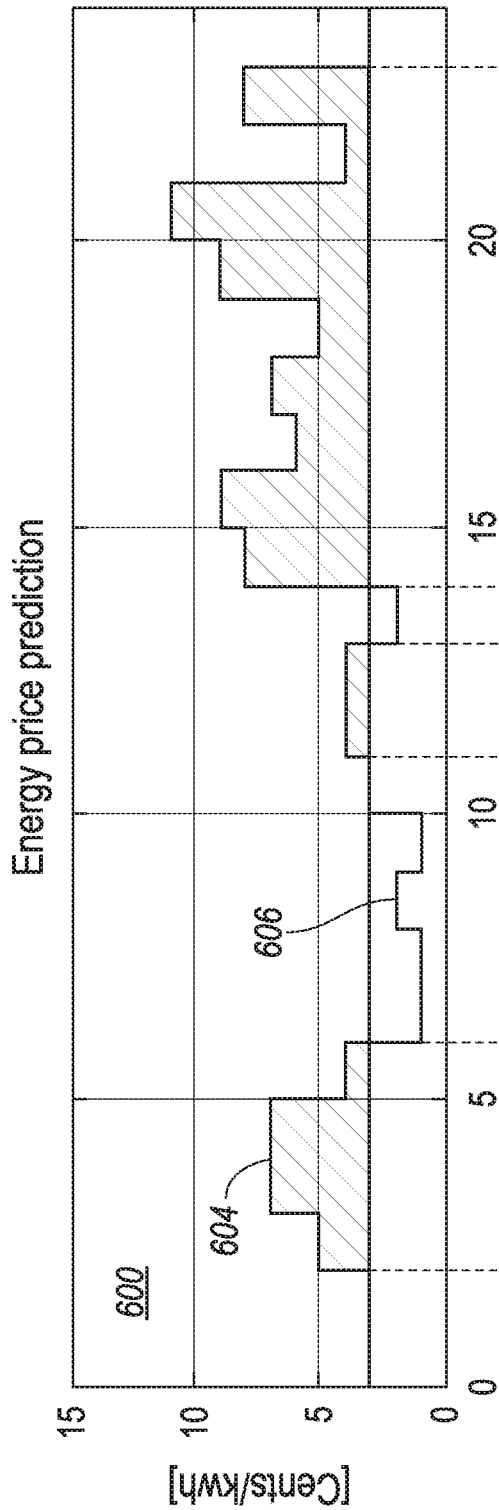
FIGS. 6A and 6B are data diagrams of the predicted power price and the predicted power demand of another embodiment of the present disclosure.
Figure 6B:
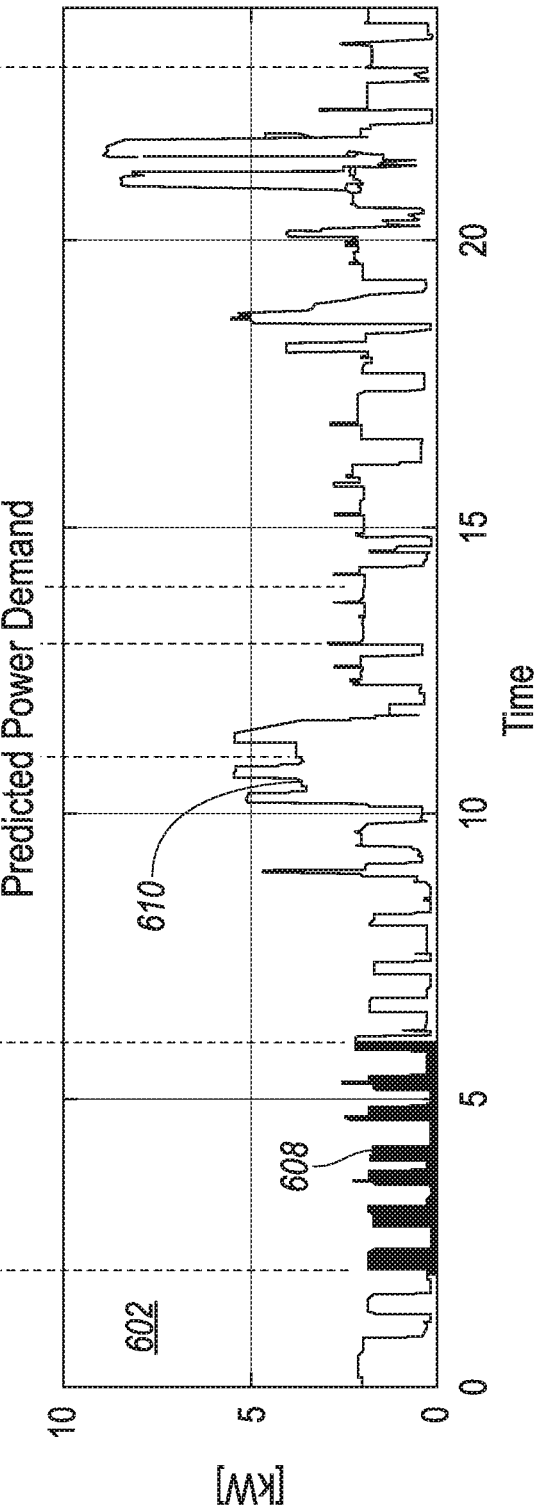

Referring to FIGS. 6A and 6B, data diagrams of another example of the present disclosure are illustrated. Different from the example discussed with reference to FIGS. 4A and 4B, in the present example, the HEMS controller 212 only determines the cumulative energy target for an immediate future period of time (6 hours in the present example) rather than the entire period of time of the energy price prediction (the next 24 hours in the present example). FIG. 6A illustrates a data graph of the predicted energy 600 and FIG. 6B illustrates a data graph of the predicted power demand 602. Similarly, one or more shaded sections 604 may correspond to timeframes within the immediate future period of time when the predicted energy price exceeds a threshold, whereas one or more unshaded sections 406 may correspond to timeframes when the predicted energy price is below the threshold. Correspondingly, the predicted power demand 602 may be divided into two sections including a shaded section 608 corresponding to timeframes that immediately follow the current timeframe and the predicted energy price exceeds the threshold, and one or more unshaded sections 610 corresponding to timeframes when the predicted energy price is below the threshold for the entire future predefined period of time, and all the timeframes afterwards.

Figure 7:
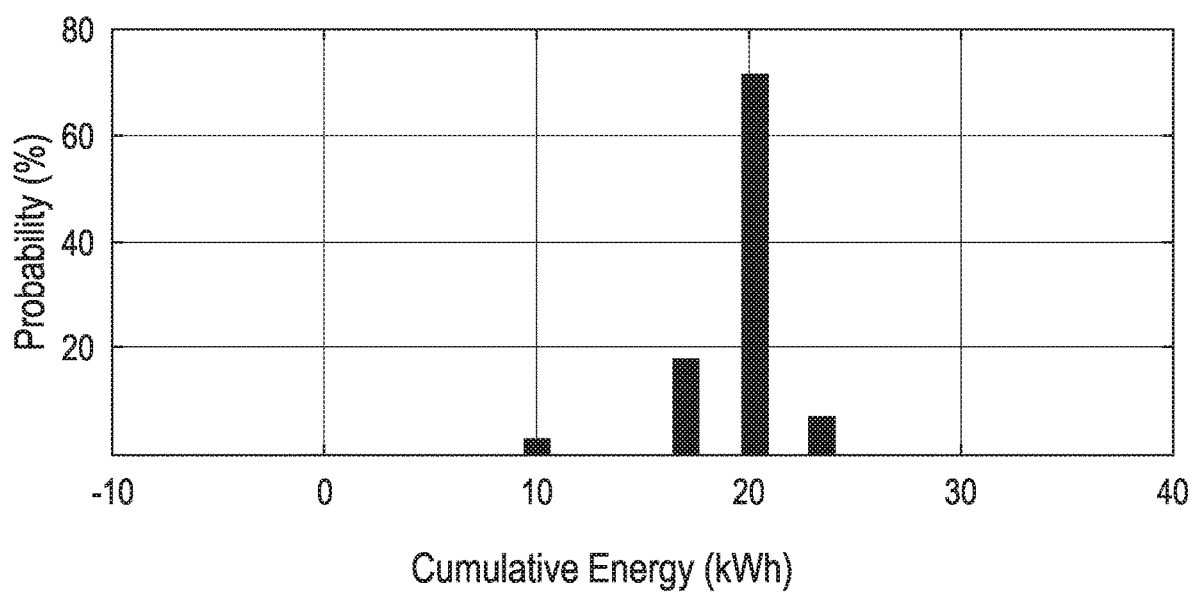
FIG. 7 is a histogram of a cumulated energy distribution of another embodiment of the present disclosure.

Similarly, since multiple energy price prediction curves are possible, each of the possible price prediction curves may result in different shade patterns and thus a different cumulative energy amount in the present example. With reference to FIG. 7, an example histogram of a cumulated energy distribution 700 resulting from those potential price prediction curves is illustrated. Since the cumulative energy target is calculated for a shorter period of time (e.g. 6 hours instead of 24 hours), the probability for the cumulative energy distribution illustrated in FIG. 7 may indicate a more predictable result. Similarly, the probability may be calculated using the Monte Carlo simulation (example illustrated in FIG. 7). Alternatively, the example illustrated with references to FIGS. 6 and 7 may be applied to various situations. The following example demonstrates another process to calculate the probability of the cumulative energy in an alternative example.

In the present example, the calculation is directed to a time frame starting with the predicted energy price being above the reference price (e.g. the current price) and ending at the predicted energy price dropping below the reference price. In other words, the HEMS controller 212 only considers the first timeframe during which the predicted energy price exceeds a threshold and disregards any subsequent timeframes due to the increased uncertainty over time. An example is illustrated with reference to FIGS. 6A and 6B. First, the entire predicted energy price period may be divided into a number of sections and each section may be associated with the predicted energy price in the future time. In the present example, the entire future prediction may be divided into twelve (12) sections. Depending on the length of the predicted energy price, each section may cover a specific timeframe. For instance, if the energy price is predicted for the next 24 hours, each section in the present example will cover a 2-hour timeframe. Alternatively, a different number of sections may be used depending on the design needs. Since there are 12 total time sections in the present example, thirteen (13) possible case scenarios may be available as illustrated in the following Table 1.

TABLE 1

Predicted energy price comparison

Compare electricity price with reference price
Case # [0- lower than current price; 1- higher; x - no need to compare]

| Case # | Array |
|---|---|
| 1 | [0, 0, 0, 0, 0, 0, 0, 0, 0, 0, 0, 0] |
| 2 | [1, 0, x, x, x, x, x, x, x, x, x, x] |
| 3 | [1, 1, 0, x, x, x, x, x, x, x, x, x] |
| 4 | [1, 1, 1, 0, x, x, x, x, x, x, x, x] |
| 5 | [1, 1, 1, 1, 0, x, x, x, x, x, x, x] |
| 6 | [1, 1, 1, 1, 1, 0, x, x, x, x, x, x] |
| 7 | [1, 1, 1, 1, 1, 1, 0, x, x, x, x, x] |
| 8 | [1, 1, 1, 1, 1, 1, 1, 0, x, x, x, x] |
| 9 | [1, 1, 1, 1, 1, 1, 1, 1, 0, x, x, x] |
| 10 | [1, 1, 1, 1, 1, 1, 1, 1, 1, 0, x, x] |
| 11 | [1, 1, 1, 1, 1, 1, 1, 1, 1, 1, 0, x] |
| 12 | [1, 1, 1, 1, 1, 1, 1, 1, 1, 1, 1, 0] |
| 13 | [1, 1, 1, 1, 1, 1, 1, 1, 1, 1, 1, 1] |

In Table 1, the array on the right column indicates which of the future timeframes should be included in the cumulated energy calculated for each respective case. The array for each case includes 12 digits corresponding to the 12 time sections in the present example. A value of one (1) in the array indicates that the predicted energy price exceeds the threshold and the corresponding time section should be included in the calculation. A value of zero (0) indicates that the predicted energy price drops below the threshold and therefore the corresponding time section should not be included in the calculation. A value of x is given to all subsequent digits in the array after the zero value as the corresponding time section is not included in the calculation. For instance, case #1 corresponds to a situation in which the predicted energy price is below the threshold for the entirety of the prediction period and therefore no calculation is needed. Case #2 corresponds to a situation in which the predicted energy price is above the threshold for the first time section and the drop below the threshold during the second section. Therefore, the HEMS controller 212 needs to calculate the cumulative energy for the first time section. Case #3 corresponds to a situation in which the predicted energy price is above the threshold for the first and second time sections and the drop below the threshold during the third section. In this case, the HEMS controller 212 needs to calculate the cumulative energy for the first and second time sections. The cases go on in like manner and will not be repeated herein. The cumulative energy distribution may be calculated using the following equations that determine the probability of occurrence for each of the 13 cases. As an example, the probability of the cumulative energy for case #2 may be calculated as:

$$P_{case2} = P\{(\bar{\gamma}[k+1] \geq \gamma[k]) \cup (\bar{\gamma}[k+2] < \gamma[k])\} \quad (3)$$

$$= P\{\bar{\gamma}[k+1] \geq \gamma[k]\} \cdot P\{\bar{\gamma}[k+2] < \gamma[k]\}$$

$$= \int_{\gamma[k]}^{\infty} pdf_{k+1}(x)dx \cdot \int_{-\infty}^{\gamma[k]} pdf_{k+2}(x)dx$$

wherein $\gamma[k]$ represents the threshold energy price (e.g. current energy price), $\bar{\gamma}[k+j]$ represents the predicted energy price in the upcoming $j^{th}$ period, $P\{\bar{\gamma}[k+1] \geq \gamma[k]\}$ represents the probability that the energy price of the first time section is higher than the current energy price, $P\{\bar{\gamma}[k+2] < \gamma[k]\}$ represents the probability that the energy price of the second time section is lower than the current energy price, $pdf_{k+1}(x)$ represents the price distribution of the first time section, and $pdf_{k+2}(x)$ represents the price distribution of the second time section. The cumulative energy for case #2 may be calculated as the load energy in the $1^{st}$ time section:

$$e_{case2} = \int_{1st\,time\,section} \text{Load}(t)dt \quad (4)$$

Similarly, the probability of the cumulative energy for case #3 may be calculated as:

$$P_{case3} = P\{(\bar{\gamma}[k+1] \geq \gamma[k]) \cup (\bar{\gamma}[k+2] \geq \gamma[k]) \cup (\bar{\gamma}[k+3] < \gamma[k])\} \quad (5)$$

$$= P\{\bar{\gamma}[k+1] \geq \gamma[k]\} \cdot P\{\bar{\gamma}[k+2] \geq \gamma[k]\} \cdot P\{\bar{\gamma}[k+3] < \gamma[k]\}$$

$$= \int_{\gamma[k]}^{\infty} pdf_{k+1}(x)dx \cdot \int_{\gamma[k]}^{\infty} pdf_{k+2}(x)dx \cdot \int_{-\infty}^{\gamma[k]} pdf_{k+3}(x)dx$$

And the cumulative energy for case #3 may be calculated as:

$$e_{case3} = \int_{period1} \text{Load}(t)dt \cdot \int_{period2} \text{Load}(t)dt \quad (6)$$

The equations to calculate the probability and cumulative energy for all cases may be generalized as follows:

$$P_{case\_i} = \left[\prod_{j=1}^{i-1} \int_{\gamma[k]}^{\infty} pdf_{k+j}(x)dx\right] \cdot \int_{-\infty}^{\gamma[k]} pdf_{k+i}(x)dx \quad (7)$$

$$e_{case\_i} = \prod_{j=1}^{i-1} \text{Load}_i(t)dt \quad (8)$$

Since the cumulative energy and the distribution probability for each case may be determined using the above equations, the expected value for the target cumulative energy Exp[e*] may be calculated using the following equations:

$$\text{Exp}[e^*] = \Sigma_{i=1}^{N} pmf[i] \cdot e^*[i] \quad (9)$$

As explained with reference to FIG. 3 operations 309 and 310, the target cumulative energy Exp[e*] may be adjusted by the capacity of the energy storage Capacity$_{ES}$ and/or the charging/discharging power $P_{charging/discharging}$.

$$\text{Exp}[e^*]_{adjusted} = \min\{\Sigma_{i=1}^{N} pmf[i] \cdot e^*[i], \text{Capacity}_{ES}, P_{charging/discharging} \cdot T\} \quad (10)$$

wherein T represents the duration of current price period.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. The words processor and processors may be interchanged herein, as may the words controller and controllers.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A power system for a building, comprising: one or more controllers programmed to,
   responsive to indication that an electricity price will exceed a threshold during a timeframe, charge one or more power storage devices to a target amount, that is based on a power demand of the building during the timeframe, before the timeframe begins,
   discharge the one or more power storage devices to supply power to the building during the timeframe, and
   adjust the threshold using the power demand such that the threshold decreases as the power demand increases.

2. The power system of claim 1, wherein the one or more controllers are further programmed to adjust the target amount based on a capacity of the one or more power storage devices.

3. The power system of claim 1, wherein the one or more controllers are further programmed to adjust the target amount based on a maximum charging power of the one or more power storage devices.

4. The power system of claim 1, wherein the one or more power storage devices includes a traction battery of a vehicle.

5. A method comprising:
   responsive to indication that an electricity price will exceed a threshold during a timeframe, charging one or more power storage devices to a target amount, that is based on a power demand of a building during the timeframe, before the timeframe begins;

discharging the one or more power storage devices to supply power to the building during the timeframe; and adjusting the threshold using the power demand such that the threshold decreases as the power demand increases.

6. The method of claim 5 further comprising adjusting the target amount based on a capacity of the one or more power storage devices.

7. The method of claim 5 further comprising adjusting the target amount based on a maximum charging power of the one or more power storage devices.

8. The method of claim 5, wherein the one or more power storage devices includes a traction battery.

9. A server in communication with a building having a power storage device, the server comprising:

one or more controllers programmed to, responsive to indication that an electricity price will exceed a threshold during a plurality of timeframes, command the power storage device to charge to a first energy level before the timeframes begin, discharge the power storage device to supply power to the building during the timeframes, wherein the first energy level is sufficient to satisfy a first power demand of the building during a first of the timeframes, and adjust the threshold using the power demand for each timeframe such that the threshold decreases as the corresponding power demand increases.

10. The server of claim 9, wherein the one or more controllers are further programmed to command the power storage device to charge to a second energy level between the first timeframe and a subsequent second timeframe to a second energy level that is insufficient to satisfy a second power demand of the building during the second timeframe, and to discharge the power storage device and draw power from a grid at a same time during the second timeframe.

11. The server of claim 9, wherein the one or more controllers are further programmed to adjust the first energy level based on a capacity of the power storage device.

12. The server of claim 9, wherein the one or more controllers are further programmed to adjust the first energy level based on a maximum charging power of the power storage device.

13. The server of claim 9, wherein the power storage device includes a traction battery of a vehicle electrically connected to the building.

* * * * *